C. M. GAY.
COMBINED STUD BOLT AND SECURING SLEEVE.
APPLICATION FILED AUG. 20, 1912.
1,232,274.
Patented July 3, 1917.
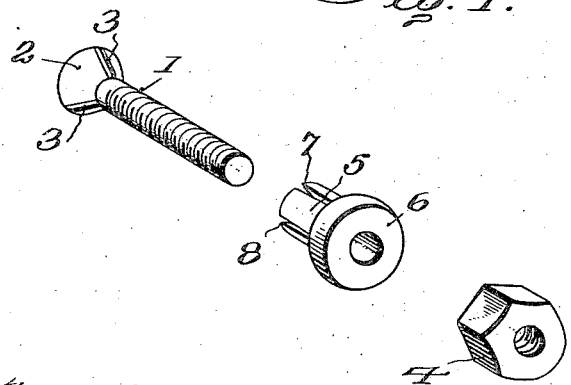
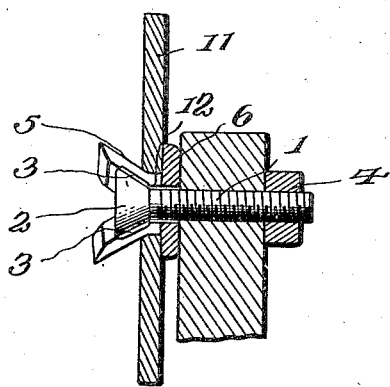
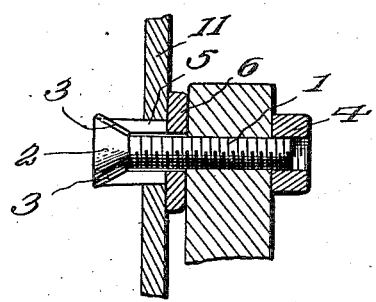
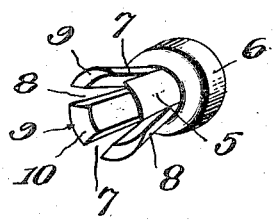
Witnesses
Inventor
C. M. Gay
By Sturtevant & Mason
Attorneys

UNITED STATES PATENT OFFICE.

CASSIUS M. GAY, OF LOS ANGELES, CALIFORNIA.

COMBINED STUD-BOLT AND SECURING-SLEEVE.

1,232,274. Specification of Letters Patent. Patented July 3, 1917.

Application filed August 20, 1912. Serial No. 715,988.

*To all whom it may concern:*

Be it known that I, CASSIUS M. GAY, a citizen of the United States, residing at Los Angeles, in the county of Los Angeles, State of California, have invented certain new and useful Improvements in Combined Stud-Bolts and Securing-Sleeves, of which the following is a description, reference being had to the accompanying drawing and to the figures of reference marked thereon.

The invention relates to new and useful improvements in combined stud bolts and sleeves for securing the stud bolts to a surface or plate which is accessible on one side only for the attachment of the bolt.

An object of the invention is to provide a securing sleeve for a stud bolt which may be readily used for attaching a bolt rigidly to a thin plate of metal or the like.

In the drawings which show by way of illustration one embodiment of the invention; Figure 1 is a perspective view showing my improved stud bolt, the securing sleeve, and the nut for the bolt, in separated relation to each other;

Fig. 2 is a sectional view showing a stud bolt attached to a plate by my improved securing sleeve;

Fig. 3 is a perspective view of the sleeve expanded;

Fig. 4 is a sectional view through the sleeve, showing the position of the stud bolt prior to the expanding of the sleeve.

I am aware that prior to my invention, it has been common to provide an expansible sleeve which may be used in connection with a headed bolt for fastening the bolt to a material where only one surface thereof is accessible. Such devices however, are not capable of use in connection with thin metal plates or structures of a similar character.

My invention consists in providing an expansible sleeve with such added features as are necessary to accomplish the attachment of a stud bolt to a thin plate, so that the bolt will be rigidly held therein.

In carrying out the invention, I have provided a stud bolt with a tapered head and with a rib which coöperates with the sleeve to prevent the stud bolt from turning relative to the sleeve. I have also provided a sleeve which is formed with a seating flange adapted to rest against the outer face of the material, to which the stud bolt is to be attached so as to form a fulcrum or an abutment, which coöperates with the stud in expanding the sleeve against the inner edges or the inner surface of the plate, so as to rigidly attach the stud bolt to the plate. Said sleeve is split longitudinally at its other end, so as to form sections which may be bent outwardly, and the sleeve thus expanded so as to firmly lock the same and the stud bolt to the part to which the bolt is to be attached.

I have also formed the sleeve with a tapered outer end to facilitate the outward bending of the section. These slits formed by the splitting of the sleeve, not only serve to divide the sleeve into sections, but also serve to coöperate with the ribs on the head of the stud bolt to prevent the stud bolt from turning relative to the sleeve.

Referring more in detail to the drawings, my improved stud bolt consists of a shank 1 and a head 2. This head is formed with a tapered inner wall, and with ribs 3, 3. I preferably provide the stud bolt with two oppositely disposed ribs, although it is obvious that any suitable number of ribs may be formed. The stud bolt is threaded, and the ordinary nut 4, is adapted to be threaded thereon.

The securing sleeve 5 is provided with an outwardly extending seating flange 6. This flange 6 is located adjacent one end of the sleeve, and is adapted to seat against the outer face of the material, to which the stud bolt is to be attached. The other end of the sleeve is diametrically split as at 7 and 8. This splitting of the sleeve forms sections 9. The outer end of the sleeve is formed with a tapered wall 10. The opening in said sleeve is substantially of the same diameter as the shank of the stud bolt.

In Figs. 2 and 4, I have shown my improved securing sleeve and stud bolt as attached to a plate 11. This plate is provided with an opening 12, which is made of substantially the same diameter as the sleeve for securing the bolt. The shank of the headed bolt is inserted through the sleeve and the sleeve is inserted in the opening 12, formed in the plate. The seating flange 6 is caused to engage the outer face of the plate. The part to be attached is then placed on the shank of the stud bolt. The nut 4 is turned on the bolt, and as this nut is pressed against the outer face of the part to be clamped, the tapered head 2 of the bolt will be drawn into the sleeve. The ribs 3 on the head engage the slits formed by splitting the sleeve and prevent the bolt from turning relative to the sleeve. The extended frictional surface formed by the seating flange 6, will prevent the sleeve from turning relative to the part to which the bolt is to be attached. As the head is drawn into the sleeve, the sections 9 are bent outwardly against the inner edges of the opening 12, and the plate is clamped between the extended portions of the sleeve, and the seating flange 6. This seating flange 6 not only serves as a frictional means for preventing the sleeve from turning in the plate, but also as a fulcrum or an abutment for preventing a movement of the sleeve through the opening as the sections 9 are bent outwardly to clamp the plate.

It will be apparent that the nut may, if desired, be threaded on to the shank without any intervening part to be clamped and the turning of the nut against the flange will cause the sleeve to be expanded and the stud firmly clamped to the plate to which it is to be attached. After the stud is firmly clamped to the plate, the nut may be removed and the bolt will be rigidly held in the plate. This not only provides a means whereby the studs may be readily clamped to the plates independently of the means which is to be attached to the stud but also permits the nut to be taken from the stud for the removal of the part to be clamped, without in any way interfering with the securing of the stud to the plate.

While I have described my device as especially adapted for attaching a holding stud to a single plate, it will be obvious from certain aspects of the invention, that my improved securing sleeve may be used in other relations to parts to which it is desired to secure a stud, which parts are so constructed or related to other structures, that only one surface is accessible.

Having thus described my invention, what I claim as new and desire to secure by Letters Patent is:—

The combination of a stud bolt having a head, a securing sleeve for said bolt, having an opening of substantially the same diameter as the shank of the bolt, said sleeve having a laterally projecting seating flange formed integral therewith adjacent one end thereof, the other end of said sleeve being split longitudinally, the inner wall of said sleeve at the split end thereof and the sides of said head, being relatively tapered, whereby an endwise movement of said head into said sleeve will spread the split portions of the sleeve, there being means for holding the bolt from turning relative to the sleeve.

In testimony whereof I affix my signature, in presence of two witnesses.

CASSIUS M. GAY.

Witnesses:
 W. G. Hess,
 M. L. Kinsey.